Patented Sept. 23, 1924.

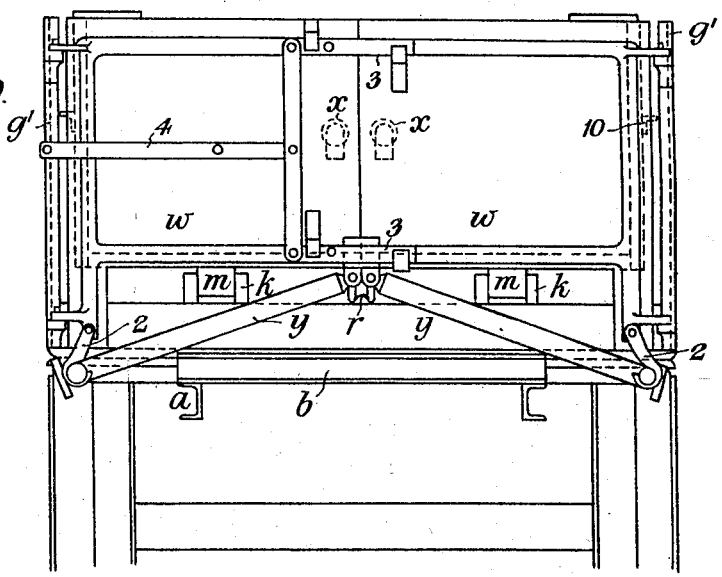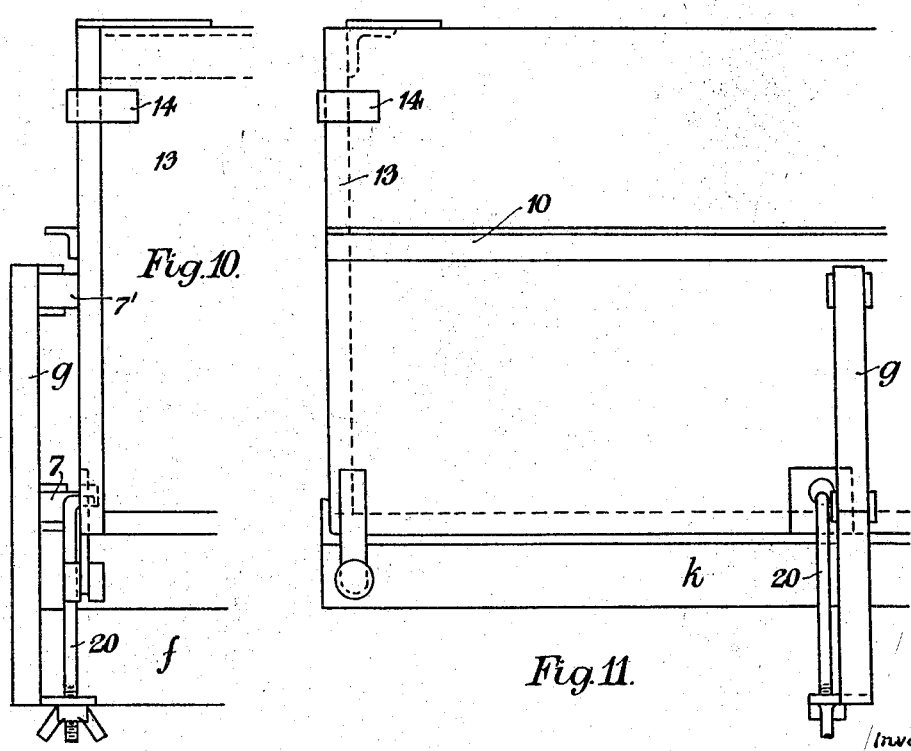

1,509,530

UNITED STATES PATENT OFFICE.

ARTHUR FORBES SHIRREFF, OF BRIDGWATER, ENGLAND.

TRANSPORT LORRY AND OTHER VEHICLE.

Application filed October 25, 1922. Serial No. 596,889.

*To all whom it may concern:*

Be it known that I, ARTHUR FORBES SHIRREFF, of Bridgwater, Somerset, England, a subject of the King of Great Britain and Ireland, have invented certain new and useful Improvements in or Relating to Transport Lorries and Other Vehicles, of which the following is a specification.

This invention relates to transport lorries and other vehicles.

The object of this invention is to provide a simple and efficient means for loading and unloading the vehicle.

According to this invention I provide a vehicle with guides and rollers on which a platform is adapted to be moved longitudinally and comprises a platform formed of a plurality of transverse members pivoted at their ends on longitudinal members or links, rollers disposed on the chassis or bottom of the vehicle on which the platform is adapted to travel; an extension is provided at the rear of the vehicle adapted to take a portion of the weight of the platform when it projects rearwardly of the vehicle, and means on the vehicle for drawing the platform on and off the vehicle.

Referring to the drawings filed herewith:—

Fig. 9 is an end view of Fig. 1 looking forward;

Fig. 10 is a part end elevation of the vehicle; and

Fig. 11 is a part longitudinal elevation of the vehicle.

The chassis which is of ordinary construction is provided with longitudinal members $a, a$, cross members $b, b$, curved bearing plates $c, c$, and lower portion $d, d$, of a turn-table provided with balls $e, e$. The under carriage comprises cross members $f, f'$, uprights $g, g'$, curved bearing members $h, h$, the upper part $j, j$ of the turn-table and longitudinal members $k, k$, carrying rollers $m, m$. At the front end of the under carriage is a shaft $n$ on which is mounted a pulley $o$. Near the rear end of the under carriage is a winch $p$ carrying a pulley $q$. On the rear cross member $f'$ is a pulley $r$. At each side of the under carriage, towards the rear end, are trough-shaped guides or bearing plates $s$ having flanges $t$. Ties $v, v$ support the last uprights $g', g'$. On the uprights $g', g'$ are pivotally mounted end doors $w$; each door is provided with a pulley $x$ and an extensible leg $y$ adapted to rest on a catch 2 when out of use and to support the door $w$ when in the open position. A suitable catch device such as levers 3, 3 and operating handle 4 is provided for locking the doors when closed.

Figure 1:
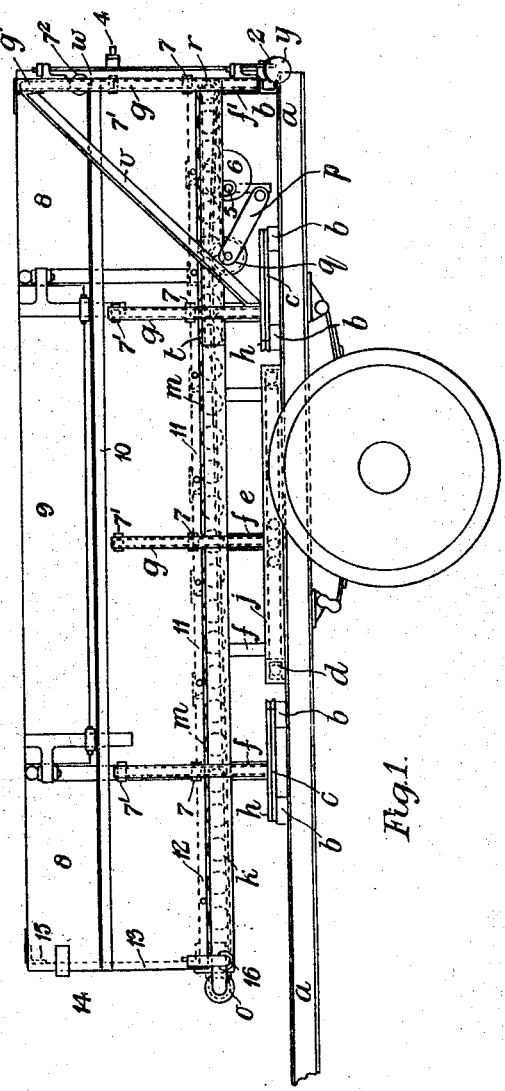
Fig. 1 is an elevation of a motor lorry body and under-carriage made in accordance with this invention.
Figure 2:
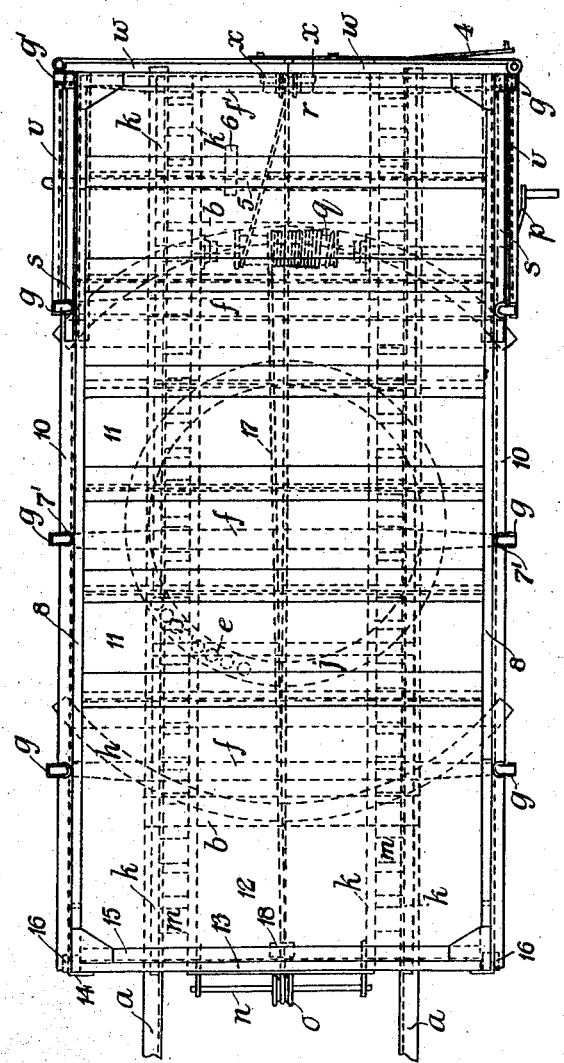
Fig. 2 is a plan view of Fig. 1.
Figure 3:
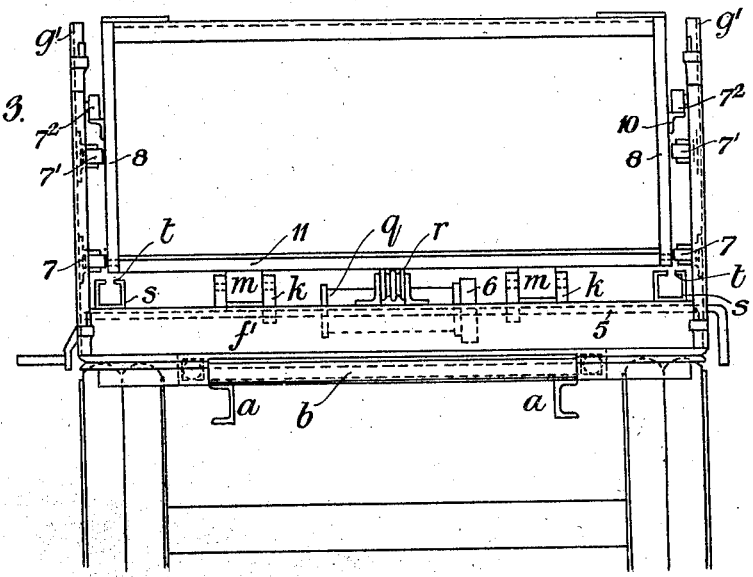
Fig. 3 is an end view looking forward with the back doors removed.
Figure 4:
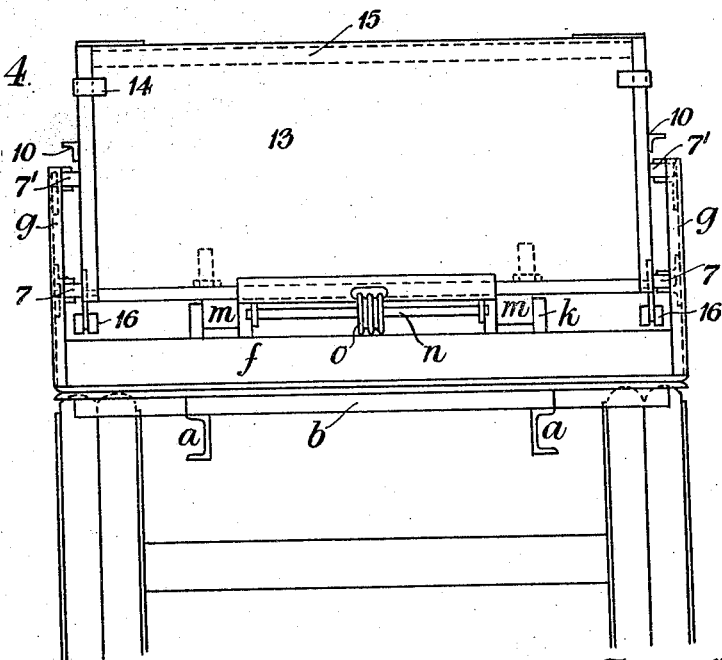
Fig. 4 is an end view looking rearward.
Figure 5:
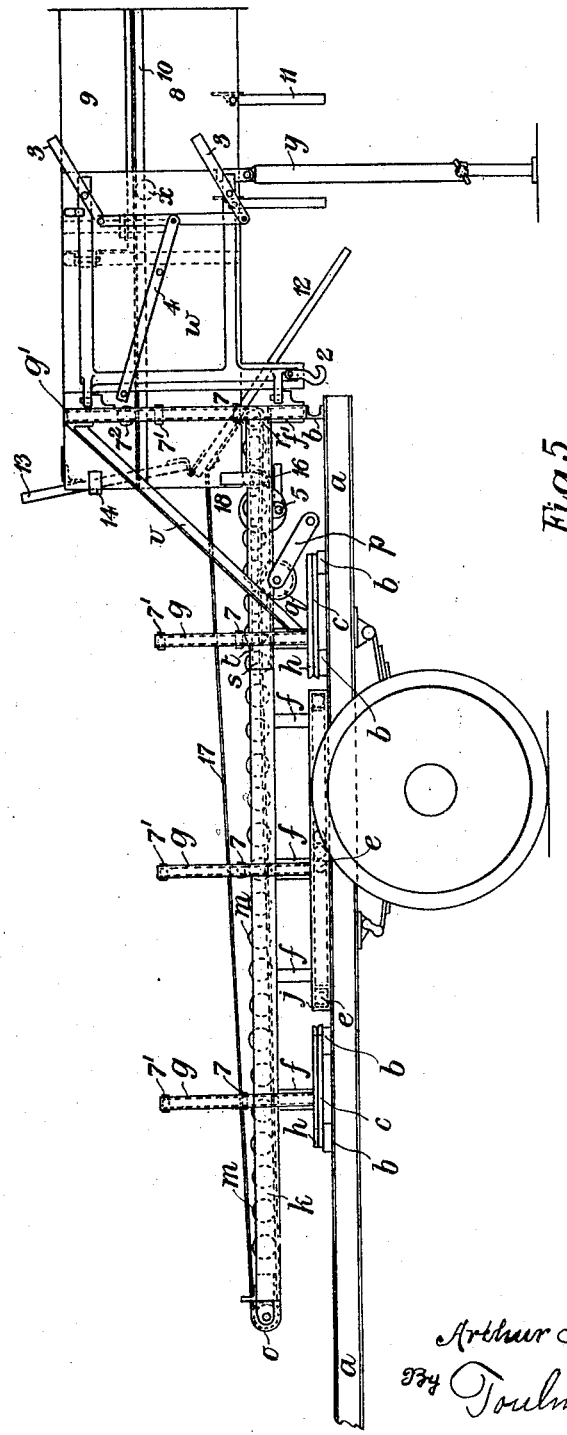
Fig. 5 is an elevation shewing the body extended rearwardly to discharge its load.
Figure 6:
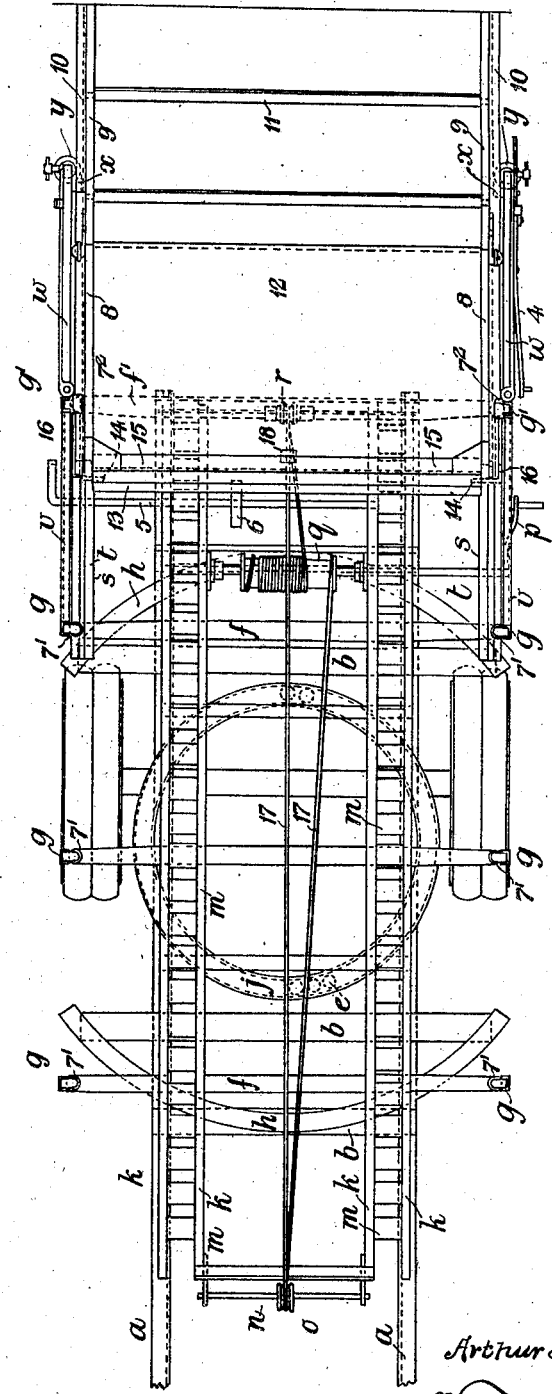
Fig. 6 is a plan view of Fig. 5.
Figure 7:
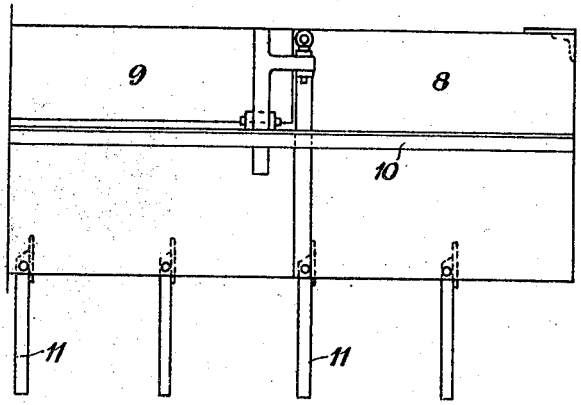
Fig. 7 is a continuation of Fig. 5.
Figure 8:
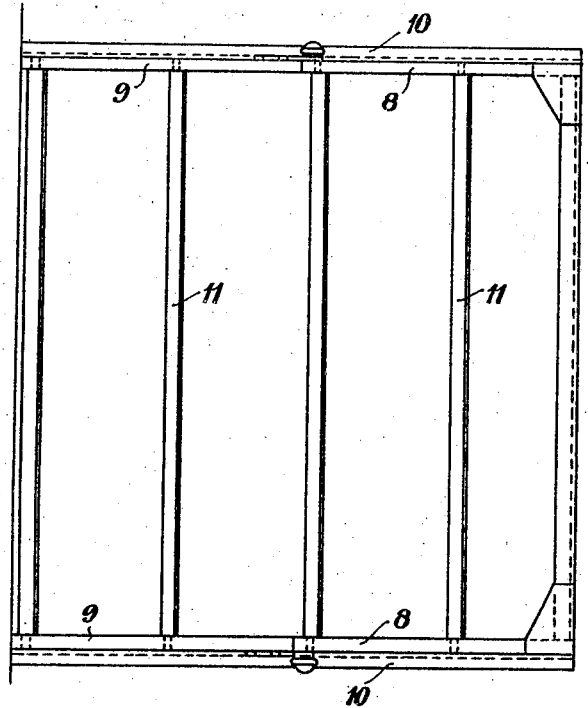
Fig. 8 is a continuation of Fig. 6.

The under carriage is provided with a shaft 5 on which is a cam 6 adapted to bear against the under side of the body and prevent its moving on the rollers when the cam is moved to the locking position. The shaft is cranked at one end as shown in Fig. 3 for operating it. On the uprights $g, g'$ are rollers 7, 7', 7². The body of the vehicle comprises sides 8, 8 in which are disposed hinged side doors 9, 9. On the sides 8, 8 are disposed longitudinal bearing angle plates 10, 10 adapted to engage the under-side of rollers 7² and the top side of rollers $x, x$ when the body is in the extended position. The bottom of the body comprises transverse members 11, 11 and 12 pivotally mounted to the sides 8, 8 and resting on the rollers $m, m$. To the forward transverse member 12 is hinged a front board 13 which is kept in position by stops 14 and cross guide angle plate 15. At the front of the body are mounted two pairs of rollers 16, 16, one pair on each side, adapted to travel in the guides $s, s$, and bear against the flanges $t, t$.

A continuous belt, rope or chain 17 passes over the pulley $q$ on the winch $p$ and over the rollers $o$ and $r$ and is secured to the front of the body at 18 and to the winch.

In operation, assuming that the body is in its travelling position and it is desired to discharge a load by the side of the road, the body is first turned on the turn-table, the doors on the under carriage are then opened and the ends supported by the extensible legs resting on the ground; the winch is then operated to draw the body back over the rollers $m$; the angle plates 10 rest against the rollers $x$ and 7², the transverse members 11, 11 being no longer supported by the rollers m, m, open and discharge the contents on to the ground. When fully extended the forward tranverse member 12 also pivots causing the front board 13 to rise and discharge the remaining portion of the load.

Catches 20 on the forward cross members f may be employed to hold the body down and prevent jolting.

What I claim and desire to secure by Letters Patent is:—

1. A transport vehicle comprising an understructure, rollers on said understructure constituting runways, a superstructure longitudinally movable over said rollers, and a bottom to said superstructure composed of independent swingable members whose operable positions are controlled by said rollers, and means for moving said superstructure.

2. A transport vehicle comprising an understructure, rear-end doors to said understructure, a superstructure longitudinally movable over said understructure, means for moving said superstructure, and means on said superstructure and on said doors and on said superstructure for jointly guiding said superstructure in its movements and supporting it when outwardly from said understructure.

3. A transport vehicle comprising an understructure consisting of a chassis and of a superposed carriage, a reciprocable superstructure including a platform, rollers on said carriage constituting runways over which said platform moves longitudinally, rollers on said carriage and complements on said platform for guiding the latter in its movements, other rollers on said platform and on said carriage and complementary parts on said platform and on said carriage for supporting said platform when moved outwards relatively to said carriage, and means for moving said platform.

4. A transport vehicle comprising a chassis; an undercarriage rotatably mounted on said chassis and including lateral longitudinal bars carrying a plurality of spaced rollers constituting runways; a body longitudinally movable upon said runways and including a platform constituting a bottom composed of a series of pivoted sections closed by contact with said runways and opened when out of contact therewith and including a front end-closing member pivoted to the adjacent said bottom-section; and hand-operated means for reciprocating said body.

5. A transport vehicle comprising a chassis; an undercarriage rotatably mounted on said chassis and including spaced longitudinally-situated rollerways, uprights carrying guide-rollers, other uprights carrying guide-rollers and bearer-rollers, stationary rear-end guide-bars, pivoted rear-end closing doors furnished with bearer-rollers and extensible swingable legs; a body longitudinally movable upon said rollerways and including a platform constituting a bottom composed of a series of pivoted transverse sections closing horizontally on contact with said rollerways and opening vertically when out of contact therewith, fixed side-closing members in contact with said guide-rollers on said uprights of said undercarriage, a front-end-closing member pivoted to the adjacent said bottom-section, guide-rollers for coacting with said stationary guide-bars on said undercarriage, and bearer-bars on said sides for co-acting with said bearer-rollers on said undercarriage uprights and doors for supporting said body when moved outwards from said undercarriage; means for moving body longitudinally outwards to unload and inwards to load and including an end-less member connected at one end to the front of said body and at the other end to a rearwardly-positioned hand-operated winch and pulleys on said undercarriage over which the member is led; and means for locking said body when normally positioned upon said undercarriage.

6. In a transport vehicle, the combination with an undercarriage furnished with rollerways, and with a body longitudinally movable over said rollerways, of doors pivoted to the rear of said undercarriage, extensible legs pivoted to said doors for assisting, when lowered and extended to assume the operative position, in supporting said body when withdrawn from said undercarriage, and means on said undercarriage for supporting said legs when returned to the inoperative position.

In testimony whereof, I affix my signature.

ARTHUR FORBES SHIRREFF.